US011881666B2

(12) United States Patent
Kain

(10) Patent No.: US 11,881,666 B2
(45) Date of Patent: Jan. 23, 2024

(54) BRUSH MODULE AND ASSEMBLY METHOD

(71) Applicant: SCHUNK CARBON TECHNOLOGY GMBH, Bad Goisern (AT)

(72) Inventor: Ludwig Kain, Bad Goisern (AT)

(73) Assignee: SCHUNK CARBON TECHNOLOGY GMBH, Bad Goisern (AT)

( * ) Notice: Subject to any disclaimer, the term of this patent is extended or adjusted under 35 U.S.C. 154(b) by 178 days.

(21) Appl. No.: 17/413,335

(22) PCT Filed: Nov. 15, 2019

(86) PCT No.: PCT/EP2019/081423

§ 371 (c)(1),
(2) Date: Jun. 11, 2021

(87) PCT Pub. No.: WO2020/120067

PCT Pub. Date: Jun. 18, 2020

(65) Prior Publication Data

US 2022/0059979 A1 Feb. 24, 2022

(30) Foreign Application Priority Data

Dec. 13, 2018 (DE) .................... 10 2018 132 050.7

(51) Int. Cl.
*H01R 39/41* (2006.01)
*H01R 39/38* (2006.01)

(52) U.S. Cl.
CPC .......... *H01R 39/41* (2013.01); *H01R 39/381* (2013.01); *H01R 39/385* (2013.01)

(58) Field of Classification Search
CPC .... H01R 39/41; H01R 39/381; H01R 39/385; H01R 39/38; H01R 39/388; H01R 39/39;
(Continued)

(56) References Cited

U.S. PATENT DOCUMENTS 2,194,620 A * 3/1940 Sekyra .................. H01R 39/41
439/28
2,947,895 A * 8/1960 Wray .................... H02K 5/148
310/239
(Continued)

FOREIGN PATENT DOCUMENTS

CN 205565251 U 9/2016
DE 3328683 A1 2/1985
(Continued)

OTHER PUBLICATIONS

EP0195929A2_translate (Year: 1986).*
DE-19755507-A1_translate (Year: 1999).*
WO-2014185021-A1_translate (Year: 2014).*

*Primary Examiner* — Tulsidas C Patel
*Assistant Examiner* — Mohammed Ahmed Qureshi
(74) *Attorney, Agent, or Firm* — Dickinson Wright PLLC; Andrew D. Dorisio

(57) ABSTRACT

The invention relates to a brush module (10) for an electric machine and to a method for mounting such a brush module, the brush module having a brush (13) for forming an electric contact with a slip ring, the brush module having an mounting device (12) and a brush holder (11) for accommodating and holding the brush, the mounting device being realized as a U-shaped sheet-metal bracket (17) which engages over the brush holder, the sheet-metal bracket having laterally protruding fastening tabs (18) for fastening the brush holder to an mounting surface (19), an access opening (25) being formed in the brush holder, a retaining tab, which is formed on a fastening tab of the sheet-metal bracket, engaging in the access opening and holding the brush in the brush holder in a retaining position (24) in a form-fitting manner, the fastening tab having the retaining tab being inclined at an angle α relative to the mounting surface of the brush holder.

14 Claims, 2 Drawing Sheets

(58) Field of Classification Search
CPC .......... H02K 5/14; H02K 5/145; H02K 5/146; H02K 5/148
See application file for complete search history.

(56) References Cited

U.S. PATENT DOCUMENTS

| | | | | | |
|---|---|---|---|---|---|
| 4,963,779 | A | * | 10/1990 | Lentino .................. | H01R 39/41 310/239 |
| 6,011,342 | A | * | 1/2000 | Walther ................. | H01R 39/36 310/239 |
| 2005/0194861 | A1 | | 9/2005 | Nedriga et al. | |

FOREIGN PATENT DOCUMENTS

| | | | | | |
|---|---|---|---|---|---|
| DE | 3432460 | A1 | | 3/1986 | |
| DE | 19755507 | A1 | * | 6/1999 | ........... H01R 39/381 |
| EP | 0195929 | A2 | * | 10/1986 | ................ B25F 5/00 |
| EP | 0195929 | A2 | | 10/1986 | |
| JP | 2010028917 | A | | 2/2010 | |
| WO | WO-2014185021 | A1 | * | 11/2014 | ............. H01R 39/40 |

* cited by examiner

BRUSH MODULE AND ASSEMBLY METHOD

TECHNICAL FIELD

The invention relates to a brush module and to a method for mounting a brush module for an electric machine, in particular an electric motor, the brush module having at least a brush for forming an electric contact with a slip ring of the machine, the brush module having an mounting device and a brush holder for accommodating and holding the brush, the mounting device being realized as a U-shaped sheet-metal bracket which engages over the brush holder, the sheet-metal bracket having laterally protruding fastening tabs for fastening the brush holder to an mounting surface.

BACKGROUND

Brush modules of this kind are well known from the state of the art and typically serve to position and fasten a brush on, for example, a slip ring or a commutator of an electric motor. In this case, the brush, which can be a carbon brush, for example, is disposed in a brush holder, the brush holder essentially enclosing the brush on its longitudinal sides. The brush is accommodated in the brush holder so as to be moveable longitudinally and is exposed to a spring force to move it toward the slip ring so that the brush is pressed on the slip ring for forming an electric contact.

The mounting device essentially serves to simplify a mounting of the brush holder on the electric machine. The mounting device is made of a U-shaped sheet-metal bracket which engages over the brush holder and which has two laterally protruding fastening tabs. Accordingly, the brush holder is inserted in the U-shaped sheet-metal bracket so as to be essentially free of play, thus enabling the brush holder and the U-shaped sheet-metal bracket to be fastened to the electric machine in the manner of a clamp, adjacent to the slip ring. For fastening or mounting the brush holder by means of screws, the fastening tabs can be screwed onto the electric machine or onto an mounting surface on which the brush holder and the fastening tabs are seated.

Known brush modules are disadvantageous in the sense that the brush is always pushed out of the brush holder because of the application of the spring force, thus making a mounting of the brush holder on the electric machine difficult. An exact positioning of the brush holder by means of the screws, which are to be inserted into the fastening tabs, is thus made considerably more difficult because of the spring force, which is caused by the brush coming into contact with the slip ring. Furthermore, locking the brush in a retaining position in the brush holder by means of fasteners in order to facilitate a mounting of the brush module on the electric machine or the slip ring by means of screws has been known practice. However, it is disadvantageous that said fasteners must be removed after mounting or that the brush must be released in an additional work step such that it abuts against the slip ring in a contact position.

SUMMARY

Therefore, the object of the present invention is to propose a brush module and a method for mounting a brush module which allows a simpler mounting of the brush module.

This object is attained by a brush module having the features of claim 1, an electric machine having the features of claim 14 and a method for mounting a brush module having the features of claim 15.

The brush module according to the invention for an electric machine, in particular an electric motor, has at least a brush for forming an electric contact with a slip ring of the machine, the brush module having an mounting device and a brush holder for accommodating and holding the brush, the mounting device being realized as a U-shaped sheet-metal bracket which engages over the brush holder, the sheet-metal bracket having laterally protruding fastening tabs for fastening the brush holder to an mounting surface, an access opening being formed in the brush holder, a retaining tab, which is formed on a fastening tab of the sheet-metal bracket, engaging in the access opening and mounting the brush in the brush holder in a retaining position in a form-fitting manner, the fastening tab having the retaining tab being inclined at an angle $\alpha$ relative to the mounting surface of the brush holder.

Thus, the brush module for the rotating electric machine has the brush holder which is formed in the manner of a shaft and which accommodates the brush or the carbon brush so as to be moveable longitudinally. For the mounting of the brush holder on the electric machine, the mounting device or the U-shaped sheet-metal bracket enclose the brush holder in the manner of a clamp, such that the brush holder is seated on the mounting surface of the electric machine. In this case, the fastening tabs are laterally disposed on the U-shaped sheet-metal bracket such that they each laterally protrude from the sheet-metal bracket in opposite directions relative to a longitudinal axis of the sheet-metal brackets. In an attached state or in a mounted configuration of the brush module, the fastening tabs and the brush holder abut against the mounting surface or are disposed in a shared mounting plane. Furthermore, the brush holder is realized such that the retaining tab is formed on at least one fastening tab of the sheet-metal bracket, the retaining tab in turn engaging in the access opening of the brush holder. In this case, the retaining tab holds the brush in the brush holder in the retaining position in such a manner that the brush does not protrude far out of the brush holder and could become a hindrance during the mounting on an electric machine.

The fastening tab having the retaining tab is inclined at angle $\alpha$ relative to the mounting surface or to the mounting plane. This means that when the brush module is seated on the mounting surface on the electric machine, at least the fastening tab having the retaining tab does not abut against the mounting surface, but instead protrudes from said mounting surface according to the inclination of angle $\alpha$. Thus, a cuneiform free space is formed between the mounting surface and the respective fastening tab. When fastening the fastening tabs onto the electric machine by means of screws, for example, the fastening tab having the retaining tab is inevitably pressed on the mounting surface such that all fastening tabs are seated in the mounting plane. For fastening or mounting the brush holder by means of screws, the fastening tabs can be screwed into the electric machine or into an mounting surface on which the brush holder and the fastening tabs are seated. Thus, the fastening tab having the retaining tab is pivoted by angle $\alpha$, the retaining tab thus being able to release the brush in the retaining position. By fastening the brush module on the electric machine, the brush can be released and transferred to a contact position in one step without having to remove particular fasteners on the brush. A mounting of the brush module can thus be simplified substantially.

Consequently, the fastening tab can be inclinable at angle $\alpha$ for coming into contact with the mounting surface, the retaining tab being able to release the brush and the brush being moveable into a contact position at an inclination of angle α. In this case, the retaining tab can be directly coupled to the fastening tab such that the retaining tab follows a pivoting motion of the fastening tab. Thus, the retaining tab no longer holds the brush in a form-fitting manner or releases the brush. Generally, it can also be intended that each of the fastening tabs has one retaining tab which then engages in the brush holder through a respective access opening. It is essential that the fastening tab is inclined relative to the mounting surface, which can be realized such that the inclination must be removed during mounting or that a movement of the retaining tab becomes necessary for mounting. However, it is preferably intended that only one fastening tab having the retaining tab is formed. The opposite fastening tab can then be formed without a corresponding inclination relative to a mounting surface or be inclined at an angle β.

It is especially advantageous if angle α is 5° to 50°. Depending on how the retaining tab and the brush are formed, angle α can be dimensioned such that by pivoting the respective fastening tab by angle α, the retaining tab is moved by a distance required for releasing the brush.

Passages for a screw can be formed in each of the fastening tabs. The passages can be realized in the manner of a hole, an oblong hole or a slot. It is essential that the passages can be permeated by a screw or another fastener, such as a rivet or the like. Thus, the brush module can be safely mounted on the electric machine in a force-fitting and/or form-fitting manner. Additionally, finely adjusting the brush module is possible in the mounting position if the passages have enough play. By means of a screw, the fastening tab having the retaining tab can also be deformed such that the fastening tab is being inclined at angle α when the screw is tightened.

It is especially advantageous if the fastening tab having the retaining tab is connected to the U-shaped sheet-metal bracket via a bendable hinge 38 (FIGS. 1 and 2). The fastening tab can then be formed integrally with the U-shaped sheet-metal bracket without requiring a special arrangement or fastening of the fastening tab on the U-shaped sheet-metal bracket. In this case, the bendable hinge 38 (FIGS. 1 and 2) can be made of the U-shaped sheet-metal bracket or the fastening tab itself. The retaining tab can also be formed by the fastening tab itself. A sheet-metal bracket of this kind can be produced cost-effectively by simply punching and bending sheet metal.

The hinge can be realized by a material weakening in a bending edge on the sheet-metal bracket. A material weakening can be a notch, a recess or a passage, for example, in the sheet metal. Thus, the material weakening can be an oblong hole, which extends along the bending edge, such that the fastening tab can be pivoted on the bending edge without much force. Furthermore, an undesired deforming of the U-shaped sheet-metal bracket or the fastening tab can also be prevented in other places.

The brush holder can have a receiving sleeve, in which the brush is held so as to be displaceable in the longitudinal direction, and a spring device, the spring device being able to be realized such that it exerts a contact pressure on the brush in the direction of a longitudinal axis of the receiving sleeve, the access opening being able to be formed in the receiving sleeve. The receiving sleeve can then form a receiving space for the brush into which the brush is inserted and in which the brush is guided in the direction of the longitudinal axis by lateral walls of the der receiving sleeve. The spring device can exert the contact pressure on a contact end in the area of said contact end of the brush. The spring device can be realized by a coiled strip spring, spiral spring or a leaf spring. In a particularly simple embodiment, a spiral spring which is realized as a pressure spring can be inserted into the receiving sleeve.

Furthermore, the brush can be realized having a groove which extends in the direction of a longitudinal axis of the brush and in which the retaining tab can engage, the groove being able to form a step on a proximal end of the brush, the retaining tab and the step together being able to form a rear stop for the brush. Thus, the groove can be realized in the brush along it without extending in it continuously. If the groove does not extend all the way to the proximal end of the brush, a step remains on the end of the groove which allows the brush to be held in the brush holder in a form-fitting manner by means of said step coming into contact with the retaining tab. Alternatively, the groove can also be realized in the manner of a recess which solely serves to engage in the retaining tab. A release of the brush becomes possible during pivoting of the retaining tab because of the retaining tab being moved out of the groove or the recess.

A guiding tab which engages in the groove can be formed on a distal end of the brush holder, the guiding tab and the step together forming a front stop for the brush. The guiding tab can be realized in the manner of a corrugation in a wall of the brush holder, the corrugation then engaging in the groove. In this case, during a longitudinal movement of the brush out of the brush holder, the step formed by the groove comes into contact with the guiding tab when the brush is almost completely moved out of the brush holder. This can be the case when abrasion has almost completely worn the brush, for example. The front stop can prevent the brush from falling out of the brush holder.

The brush holder can have a positioning recess in which a positioning tab made of the sheet-metal bracket engages. In this case, an additional tab can be formed on the U-shaped sheet-metal bracket, the additional tab engaging in the positioning recess in a form-fitting manner and thus allowing an exact positioning of the brush holder relative to the U-shaped sheet-metal bracket. In this case, the brush holder and the U-shaped sheet-metal bracket can easily be mounted by plugging them together without requiring a special alignment in the desired relative position. Vice versa, the sheet-metal bracket can have the positioning recess and the brush holder can have the positioning tab. A plurality of positioning recesses can also be provided such that a positioning is possible in different pre-determined positions.

The positioning recess can be realized by the access opening. Advantageously, the access opening can be realized such that the positioning tab engages in the access opening. In this case, the positioning tab is in particular realized such that it does not come into contact with the brush. It is also essential that the positioning tab is not directly connected to the fastening tab as the positioning tab might otherwise move during mounting. The access opening can also be large enough for the positioning tab and the retaining tab to be able to engage therein.

The sheet-metal bracket can have laterally protruding positioning tabs, which are disposed parallel to each other, for fastening the brush holder on parallel lateral surfaces of a carrier realizing the mounting surface.

The relative distance of the positioning tabs can be dimensioned such that the brush holder or the sheet-metal bracket can be plugged onto the carrier and be fastened between the positioning tabs while generating a spring force. Thus, the brush module can be easily pre-positioned on the carrier, facilitating a mounting of the brush module. In this case, it is no longer necessary to hold the brush module in place or align it precisely during manual mounting. Driving screws into the carrier or the mounting surface is thus facilitated substantially.

In a preferred embodiment, the brush holder is made of sheet metal. In this case, the access opening can easily be realized by punching. Furthermore, the shaft-shaped brush holder can be produced cost-effectively by bending sheet metal.

Thus, the electric machine according to the invention, in particular the electric motor, has a brush module according to the invention. The simplified mounting of the brush module allows the electric machine to be produced more cost-effectively.

In the method according to the invention for mounting a brush module on an electric machine, in particular an electric motor, at least a brush of the brush module forms an electric contact with a slip ring of the machine, the brush being accommodated and held in a brush holder of the brush module, an mounting device of the brush module being realized as a U-shaped sheet-metal bracket which engages over the brush holder, the sheet-metal bracket being realized having laterally protruding fastening tabs, the brush holder being fastened to an mounting surface by means of the fastening tabs, an access opening being formed in the brush holder, a retaining tab, which is formed on a fastening tab of the sheet-metal bracket, engaging in the access opening and holding the brush in the brush holder in a retaining position in a form-fitting manner, the fastening tab having the retaining tag being inclined at an angle α relative to the mounting surface of the brush holder. For further details on the advantageous effects of the method according to the invention, reference is made to the description of advantages of the device according to the invention.

Furthermore, the fastening tab can be inclined at angle α and come into contact with the mounting surface, the retaining tab being able to release the brush and the brush being moveable into a contact position at an inclination at angle α. In the case of the exemplary fastening of the fastening tab on the mounting surface by means of a screw, the fastening tab is pivoted by angle α such that the fastening tab moves into the mounting plane, the retaining tab likewise being pivoted by angle α because of the pivoting of the fastening tab and said retaining tab being moved so far out of the access opening that the brush is no longer held in the brush holder or in the retaining position by the retaining tab in a form-fitting manner. The brush can now move out of the brush holder, preferably so far that it abuts against the slip ring in a contact position. Consequently, the brush is unlocked or released by means of the brush module being mounted on the mounting surface of the electric machine without requiring an additional work step.

Further embodiments of the method are apparent from the description of features of the dependent claims referring back to device claim 1.

BRIEF DESCRIPTION OF THE DRAWINGS

Hereinafter, the invention will be described in more detail with reference to the accompanying drawings.

In the figures.

DETAILED DESCRIPTION

Figure 1:
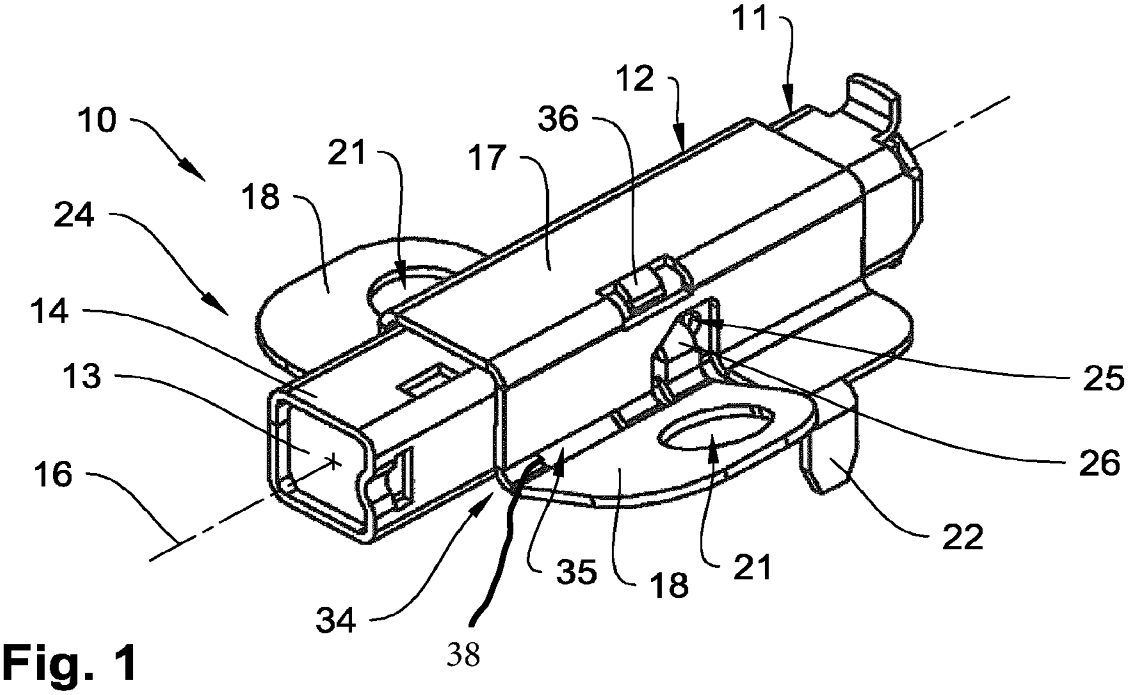
FIG. 1 shows a perspective view of a brush module.

A combined view of FIGS. 1 to 4 shows a brush module 10 in different views. Brush module 10 serves to form an electrical contact with a slip ring of an electric machine (not illustrated) and comprises a brush holder 11, a mounting device 12 and a brush 13. Brush 13 is essentially made of a carbon material and is inserted into brush holder 11 and held therein so as to be moveable longitudinally. Brush holder 11 realizes a receiving sleeve 14 for brush 13 and comprises a spring 15 which exerts a contact pressure on brush 13 in the direction of a longitudinal axis 16 of receiving sleeve 14, such that brush 13 can be pressed against the slip ring (not illustrated) by means of the contact pressure.

Mounting device 12 is realized as a U-shaped sheet-metal bracket 17 which engages over brush holder 11 and which has laterally protruding fastening tabs 18 for fastening brush holder 11 on a mounting surface 19 (only schematically illustrated). Mounting surface 19 is realized on the electric machine (not illustrated) by a carrier 20. Carrier 20 is positioned such that brush module 10 can be mounted on the slip ring in a desired position. Passage openings 21 are formed in each fastening tab 18, screws (not illustrated) being insertable through each passage opening 21 and being able to be screwed into carrier 20 for mounting the brush holder on carrier 20. Furthermore, laterally protruding positioning tabs 22 which serve for fastening brush holder 11 on parallel lateral surfaces 23 of carrier 20 are realized on sheet-metal bracket 17. Positioning tabs 22 are realized parallel to each other and are distanced so far from each other that a clamping force can be exerted on lateral surfaces 23 of carrier 20 between positioning tabs 22. It is thus possible to pre-position brush module 10 on carrier 20.

Figure 2:
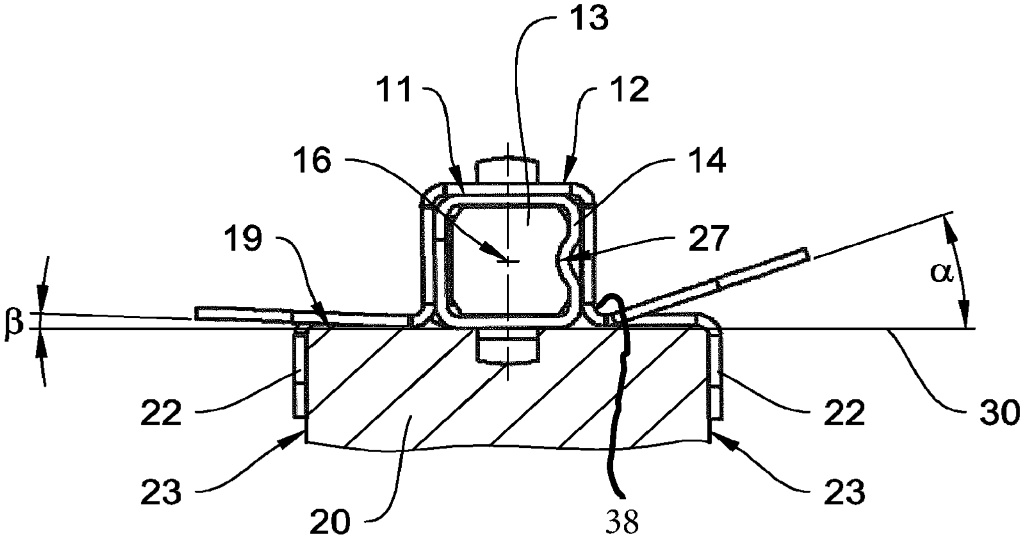
FIG. 2 shows a front view of the brush module before a mounting of the brush module.

FIGS. 1 and 2 show brush module 10 before a final mounting on carrier 20, brush 13 being disposed in a retaining position 24 in brush holder 11 in this case. In particular, an access opening 25, in which a retaining tab 26 formed on a fastening tab 18 engages, is formed in brush holder 11. In this case, retaining tab 26 holds brush 13 in retaining position 24 in a form-fitting manner, fastening tab 18 having retaining tab 26 being inclined at an angle α relative to mounting surface 19. A groove 27 is formed in brush 13, said groove 27 forming a step 29 on a proximal end 28 of brush 13. Retaining tab 26 engages in groove 27 and, by means of establishing contact on step 29, prevents brush 13 from being pushed out of receiving sleeve 14 via spring 15.

Figure 3:
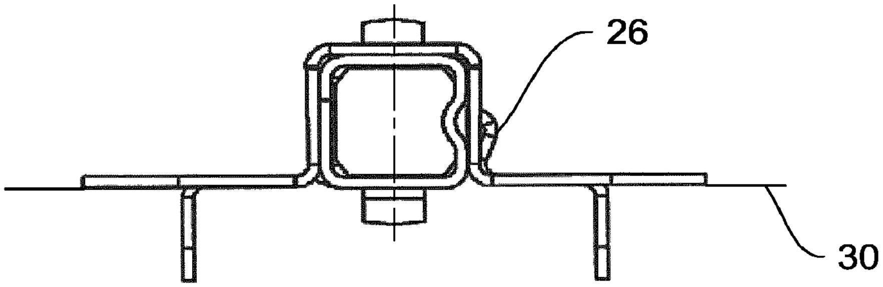
FIG. 3 shows the front view of the brush module after the mounting of the brush module.
Figure 4:
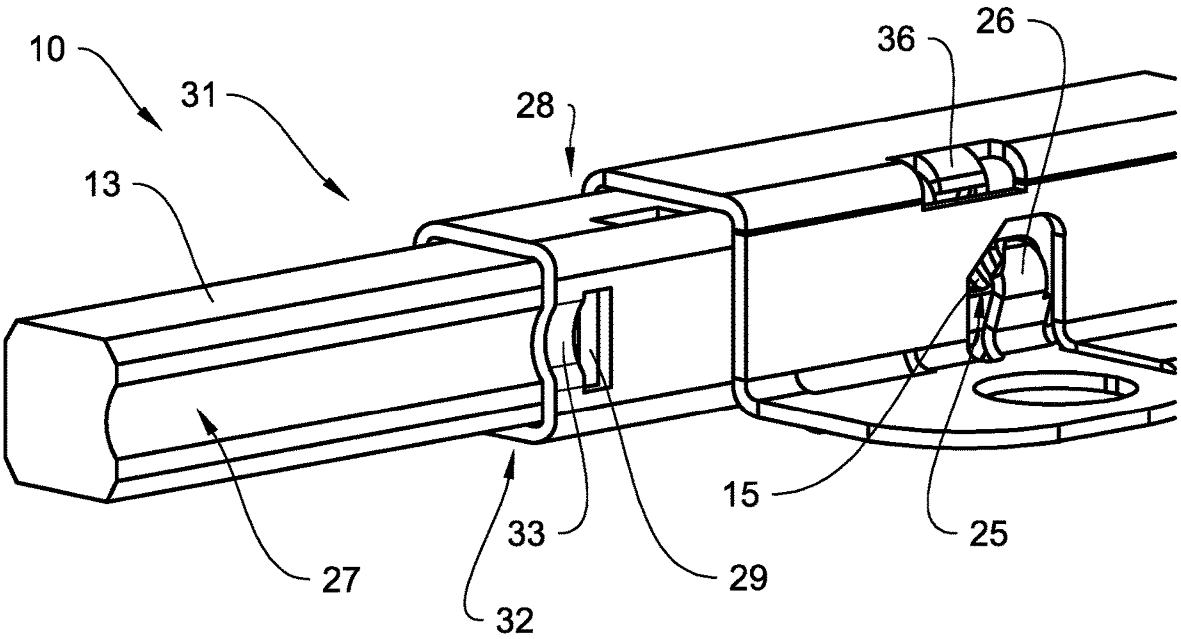
FIG. 4 shows a perspective view of the brush module after the mounting of the brush module.

FIGS. 3 and 4 show brush module 10 after a mounting of brush module 10 on carrier 20 by means of being screwed onto carrier 20. In this case, fastening tabs 18 are disposed in a shared mounting plane 30 with mounting surface 19. During screwing, fastening tabs 18 are bent or approximated by respective angles α and β in the direction of mounting plane 30 or mounting surface 19 until they abut flatly on mounting surface 19. In particular during pivoting of fastening tab 18 having retaining tab 26, retaining tab 26 is moved so far out of groove 27 that step 29 is released. By means of spring 15, brush 13 can now be moved into contact position 31 (shown in FIG. 4) or into the position reached on the worn end of brush 13. To prevent brush 13 from falling out of receiving sleeve 14, a guiding tab 33 is formed on a distal end 32 of receiving sleeve 14, said guiding tab 33 engaging in groove 27 and being able to come into contact with step 29. The guiding tab essentially prevents brush 13 from falling out of receiving sleeve 14.

To ensure a pivoting of fastening tab 18 having retaining tab 26 by angle α in the desired manner, an oblong hole 35 is formed in a bending edge 34 on sheet-metal bracket 17, such that a defined pivoting movement on bending edge 34 becomes possible. Furthermore, access opening 25 in receiving sleeve 14 serves to exactly position brush holder 11 in sheet-metal bracket 17. Thus, a positioning tab 36 which engages in access opening 25 without coming into contact with brush 13 is formed on sheet-metal bracket 17. In this manner, positioning tab 36 determines a position of brush holder 11 in the direction of longitudinal axis 16 relative to sheet-metal bracket 17.

The invention claimed is:

1. A brush module (10) for an electric machine, the brush module having at least a brush (13) for forming an electric contact with a slip ring of the machine, the brush module having an mounting device (12) and a brush holder (11) for accommodating and holding the brush, the mounting device being realized as a U-shaped sheet-metal bracket (17) which engages over the brush holder, the sheet-metal bracket having laterally protruding fastening tabs (18) for fastening the brush holder to an mounting surface (19), wherein an access opening (25) is formed in the brush holder, a retaining tab (26), which is formed on a fastening tab of the sheet-metal bracket, engaging in the access opening and holding the brush in the brush holder in a retaining position (24) in a form-fitting manner, the fastening tab having the retaining tab being inclined at an angle α relative to the mounting surface of the brush holder, and the fastening tab (18) is inclinable at angle α for coming into contact with the mounting surface (19), the retaining tab (26) releasing the brush (13) and the brush being moveable into a contact position (31) when the fastening tab is at an inclination of angle α, wherein the retaining tab is coupled to the fastening tab such that the retaining tab follows movement of the fastening tab through angle α to release the brush and permit the brush to be moveable into the contact position.

2. The brush module according to claim 1, wherein the angle α is 5° to 50°.

3. The brush module according to claim 1, wherein passages (21) for a screw are formed in each of the fastening tabs (18).

4. The brush module according to claim 1, wherein the fastening tab (18) having the retaining tab (26) is connected to the U-shaped sheet-metal bracket (17) via a bendable hinge.

5. The brush module according to claim 4, wherein the hinge is realized by a material weakening in a bending edge (34) on the sheet-metal bracket (17).

6. The brush module according to claim 1, wherein the brush holder (11) has a receiving sleeve (14), in which the brush (13) is held so as to be displaceable in the longitudinal direction, and a spring device (15), the spring device being realized such that it exerts a contact pressure on the brush in the direction of a longitudinal axis (16) of the receiving sleeve, the access opening (25) being formed in the receiving sleeve.

7. The brush module according to claim 1, wherein the brush (13) is realized having a groove (27) which extends in the direction of a longitudinal axis (16) of the brush and in which the retaining tab (26) engages, the groove forming a step (29) on a proximal end (28) of the brush, the retaining tab and the step together forming a rear stop for the brush.

8. The brush module according to claim 7, wherein a guiding tab (33) which engages in the groove (27) is formed on a distal end (32) of the brush holder (11), the guiding tab and the step (29) together forming a front stop for the brush (13).

9. The brush module according to claim 1, wherein the brush holder (11) has a positioning recess in which a positioning tab (36) formed by the sheet-metal bracket engages.

10. The brush module according to claim 9, wherein the positioning recess is realized by the access opening (25).

11. The brush module according to claim 1, wherein the sheet-metal bracket (17) has laterally protruding positioning tabs (22), which are disposed parallel to each other, for fastening the brush holder on parallel lateral surfaces (23) of a carrier (20) realizing the mounting surface (19).

12. The brush module according to claim 1, wherein the brush holder (11) is made of sheet metal.

13. An electric machine, wherein the electric machine has a brush module (10) according to claim 1.

14. A method for mounting a brush module (10) on an electric machine, at least a brush (13) of the brush module forming an electric contact with a slip ring of the machine, the brush being accommodated and holding in a brush holder (11) of the brush module, an mounting device (12) of the brush module being realized as a U-shaped sheet-metal bracket (17) which engages over the brush holder, the sheet-metal bracket being realized having laterally protruding fastening tabs (18), the brush holder being fastened to a mounting surface (19) by means of the fastening tabs, wherein an access opening (25) is formed in the brush holder, a retaining tab (26), which is formed on a fastening tab of the sheet-metal bracket, engaging in the access opening and holding the brush in the brush holder in a retaining position (24) in a form-fitting manner, the fastening tab having the retaining tab being inclined at an angle α relative to the mounting surface of the brush holder, and wherein the fastening tab (18) is inclined at angle α and comes into contact with the mounting surface (19), the retaining tab (26) releasing the brush (13) and the brush being moved into a contact position (31) when the fastening tab is at an inclination of angle α and wherein the retaining tab is coupled to the fastening tab such that the retaining tab follows movement of the fastening tab through angle α to release the brush and permit the brush to be moveable into the contact position.

* * * * *